US009203534B2

(12) United States Patent
Hwang et al.

(10) Patent No.: US 9,203,534 B2
(45) Date of Patent: Dec. 1, 2015

(54) METHOD AND APPARATUS FOR TRANSMITTING AND RECEIVING SIGNALING INFORMATION FOR RECEPTION OF BROADCAST SERVICES IN A DIGITAL BROADCASTING SYSTEM

(75) Inventors: Sung-Oh Hwang, Gyeonggi-do (KR); Alain Mourad, Middlesex (GB); Ismael Gutierrez, Middlesex (GB)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/526,056

(22) Filed: Jun. 18, 2012

(65) Prior Publication Data

US 2012/0324513 A1 Dec. 20, 2012

Related U.S. Application Data

(60) Provisional application No. 61/497,782, filed on Jun. 16, 2011.

(30) Foreign Application Priority Data

Oct. 4, 2011 (KR) ........................ 10-2011-0100522

(51) Int. Cl.

| | |
|---|---|
| ***G06F 3/00*** | (2006.01) |
| ***G06F 13/00*** | (2006.01) |
| ***H04N 5/445*** | (2011.01) |
| ***H04N 7/173*** | (2011.01) |
| ***H04N 7/16*** | (2011.01) |
| ***H04H 20/65*** | (2008.01) |
| ***H04H 60/86*** | (2008.01) |

(52) U.S. Cl.

CPC ............... *H04H 20/65* (2013.01); *H04H 60/86* (2013.01)

(58) Field of Classification Search

USPC .............................. 725/54, 98, 112, 118, 148

See application file for complete search history.

(56) References Cited

U.S. PATENT DOCUMENTS

| | | | | |
|---|---|---|---|---|
| 2009/0034556 | A1 | 2/2009 | Song et al. | |
| 2009/0303958 | A1 * | 12/2009 | Vesma et al. | 370/330 |
| 2010/0195633 | A1 * | 8/2010 | Vare | H04W 36/385 370/338 |
| 2010/0211975 | A1 | 8/2010 | Boyer et al. | |
| 2011/0099579 | A1 | 4/2011 | Kim et al. | |
| 2012/0288031 | A1 * | 11/2012 | Vare | H04N 21/4345 375/316 |
| 2012/0331508 | A1 * | 12/2012 | Vare | H04L 65/4076 725/50 |
| 2013/0034032 | A1 * | 2/2013 | Vare | H04L 69/22 370/310 |
| 2013/0121229 | A1 * | 5/2013 | Vare | H04H 20/22 370/312 |
| 2013/0291046 | A1 * | 10/2013 | Ko | H04L 5/0053 725/116 |

FOREIGN PATENT DOCUMENTS

| | | |
|---|---|---|
| EP | 1 816 766 | 8/2007 |
| EP | 2 209 238 | 7/2010 |
| WO | WO 2012/152989 | 11/2012 |

* cited by examiner

*Primary Examiner* — Pinkal R Chokshi
*Assistant Examiner* — Alexander Gee
(74) *Attorney, Agent, or Firm* — The Farrell Law Firm, P.C.

(57) ABSTRACT

A method and apparatus for transmitting and receiving signaling information for receiving broadcast services in a digital broadcasting system. The method includes generating service guide information including broadcast service data, information about a transmission network where the broadcast service data is transmitted, and information about a transmission network neighboring the transmission network, and transmitting the service guide information in an upper layer of an Internet Protocol (IP) layer.

36 Claims, 3 Drawing Sheets

METHOD AND APPARATUS FOR TRANSMITTING AND RECEIVING SIGNALING INFORMATION FOR RECEPTION OF BROADCAST SERVICES IN A DIGITAL BROADCASTING SYSTEM

PRIORITY

This application claims priority under 35 U.S.C. §119 to U.S. Provisional Application Ser. No. 61/497,782, which was filed in United States Patent and Trademark Office on Jun. 16, 2011, and Korean Patent Application Serial No. 10-2011-0100522, which was filed in the Korean Intellectual Property Office on Oct. 4, 2011, the entire disclosure of each of which is incorporated herein by reference.

BACKGROUND OF THE INVENTION

1. Field of the Invention

The present invention relates generally to a digital broadcasting system, and more particularly, to a method and apparatus for transmitting and receiving signaling information for reception of broadcast services in a digital broadcasting system.

2. Description of the Related Art

An example of a second-generation mobile broadcast standard is Next Generation Handheld (NGH), which is established by Digital Video Broadcasting (DVB), a European digital broadcast standards organization. DVB-NGH utilizes a Moving Picture Experts Group 2 (MPEG2) Transport Stream (TS)-based profile for ensuring the maximum capability with terrestrial broadcasting networks, and an Internet Protocol (IP) profile for interoperability with an IP network, which is expected to be used as a backbone network of next-generation broadcasting networks.

The MPEG2 TS profile provides broadcast service data, information about a transmission network in which the broadcast service data is transmitted, and physical layer information of the transmission network, using Program Specific Information/Service Information (PSI/SI) technology used in MPEG2 TS standards and DVB standards. However, the IP profile, because it does not use MPEG2 TS-based PSI/SI, should provide broadcast service data, information about a transmission network in which the broadcast service data is transmitted, and physical layer information (i.e., signaling information) of the transmission network, using a separate method.

SUMMARY OF THE INVENTION

The present invention is designed to address at least the problems and/or disadvantages described above and to provide at least the advantages described below.

Accordingly, an aspect of the present invention is to provide a method and apparatus for efficiently transmitting and receiving signaling information for reception of broadcast services in a digital broadcasting system.

Another aspect of the present invention is to provide a method and apparatus for efficiently transmitting signaling information using an IP-based network.

Another aspect of the present invention is to provide a method and apparatus for transmitting and receiving signaling information for reception of broadcast services using a Service Guide Delivery Descriptor (SGDD) in a digital broadcasting system.

In accordance with an aspect of the present invention, a method is provided for transmitting signaling information for receiving a broadcast service in a digital broadcasting system. The method includes generating service guide information including broadcast service data, information about a transmission network where the broadcast service data is transmitted, and information about a transmission network neighboring the transmission network; and transmitting the service guide information in an upper layer of an Internet Protocol (IP) layer.

In accordance with another aspect of the present invention, an apparatus is provided for transmitting signaling information for receiving a broadcast service in a digital broadcasting system. The apparatus includes a generator for generating service guide information including broadcast service data, information about a transmission network where the broadcast service data is transmitted, and information about a transmission network neighboring the transmission network; and a transmitter for transmitting the service guide information in an upper layer of an Internet Protocol (IP) layer.

In accordance with another aspect of the present invention, a method is provided for receiving signaling information for receiving a broadcast service in a digital broadcasting system. The method includes receiving service guide information in an upper layer of an Internet Protocol (IP) layer; and checking broadcast service data, information about a transmission network where the broadcast service data is transmitted, and information about a transmission network neighboring the transmission network, which are included in the source guide information.

In accordance with another aspect of the present invention, an apparatus is provided for receiving signaling information for receiving a broadcast service in a digital broadcasting system. The apparatus includes a receiver for receiving service guide information in an upper layer of an Internet Protocol (IP) layer; and a controller for checking broadcast service data, information about a transmission network where the broadcast service data is transmitted, and information about a transmission network neighboring the transmission network, which are included in the source guide information.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details such as detailed configurations and components are merely provided to assist the person of ordinary skill in the art with an overall understanding of the exemplary embodiments of the present invention. Therefore, a person of ordinary skill in the art should appreciate that various changes and modifications of the embodiments described herein can be made without departing from the scope and spirit of the present invention, as defined by the appended claims. In addition, descriptions of well-known functions and constructions may be omitted for clarity and conciseness when their inclusion might obscure the subject matter of the present invention.

Although embodiments of the present invention will be described below with reference to DVB-NGH and Open Mobile Alliance Mobile Broadcasting Service (OMA BCAST) technology, which is an application layer standard for mobile broadcast, among broadcast technologies to which the present invention is applicable, by way of example, the scope of the present invention is not limited thereto.

Figure 1:
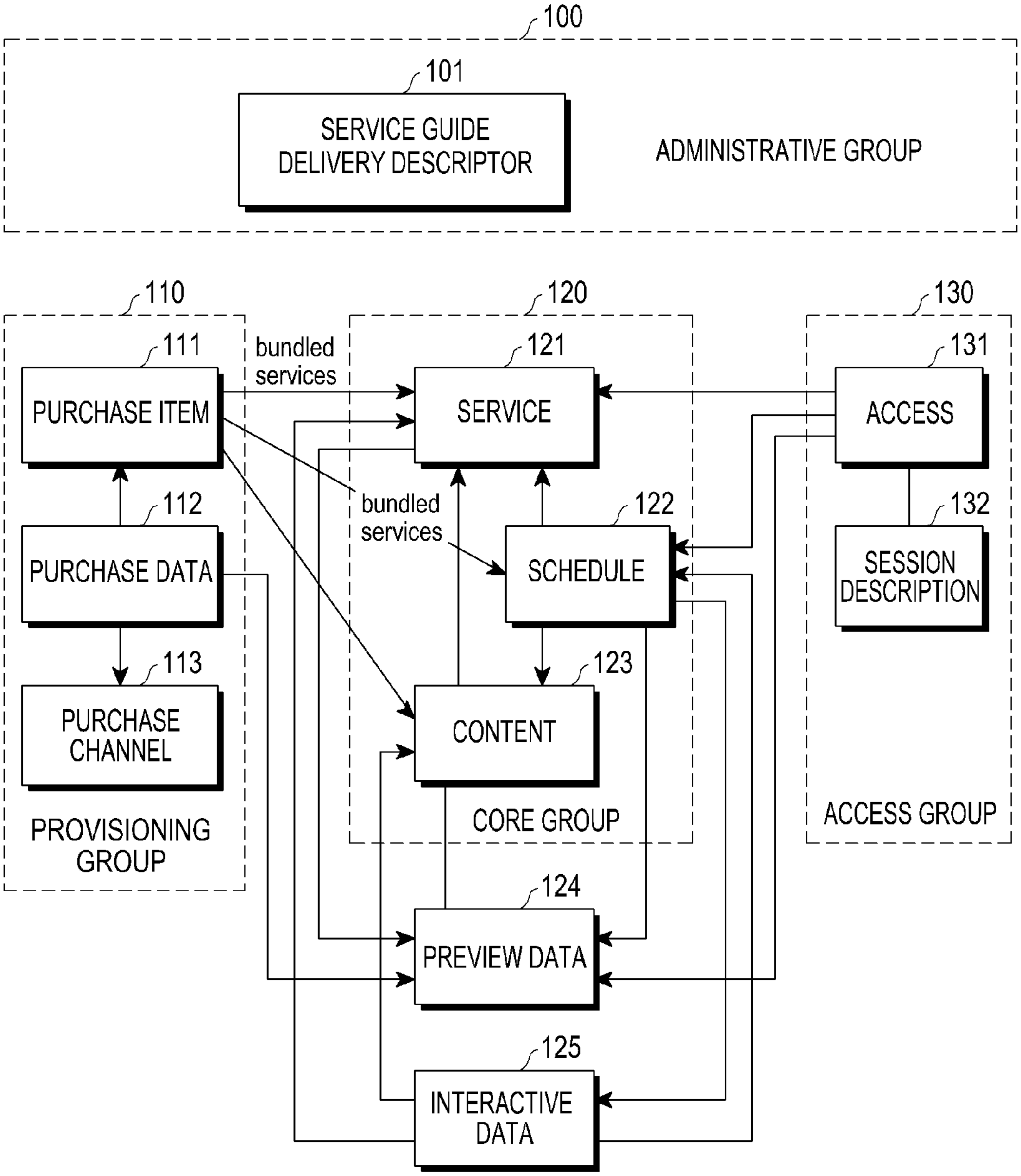
FIG. 1 illustrates a broadcast service guide for receiving broadcast services in a mobile broadcasting system according to an embodiment of the present invention.

FIG. 1 illustrates a broadcast service guide for receiving broadcast services in a mobile broadcasting system, according to an embodiment of the present invention. Specifically, FIG. 1 illustrates a data model of a broadcast service guide that for providing broadcast services to terminals.

Referring to FIG. 1, the broadcast service guide includes fragments that have different purposes, where the fragments are classified into four groups according to their capabilities. Specifically, the broadcast service guide includes an administrative group 100 for providing parent (upper-rank) configuration information of the entire broadcast service guide, a provisioning group 110 for providing rate (or fee) information for receiving broadcast services, a core group 120 for providing core information of the broadcast service guide, such as broadcast services, content, and broadcasting service schedule, and an access group 130 for providing access information for accessing broadcast services or content. In FIG. 1, solid lines connecting fragments refer to cross-references between the fragments.

The administrative group 100, which is a group providing basic information with which a terminal receives the broadcast service guide, includes a Service Guide Delivery Descriptor (SGDD) 101. The SGDD 101 provides information about a channel on which a plurality of broadcast service guide's fragments may be received, scheduling information, and update information, to a terminal, such that the terminal may timely receive the broadcast service guide.

The provisioning group 110 is a group for providing rate information for reception of broadcast services and includes a purchase item fragment 111, a purchase data fragment 112, and a purchase channel fragment 113. The purchase item fragment 111 provides rate information for bundles of broadcast services, content, and time, to a user, which help the user subscribe to or purchase desired purchase items. The purchase data fragment 112 provides information about the ways the user can pay the fee. The purchase channel fragment 113 provides access information for subscribing to or purchasing broadcast services.

The core group 120 provides information about broadcast services themselves. Specifically, the core group 120 includes a service fragment 121, a schedule fragment 122, and a content fragment 123. The service fragment 121, which is a core of the broadcast service guide or a parent (or top) collection of content included in broadcast services, provides information about synopses, genres, and service areas of broadcast services. The schedule fragment 122 provides time information for each content included in the broadcast services, e.g., streaming and downloading. The content fragment 123 provides information about detailed descriptions, target user groups, service areas, and genres for the broadcast content.

The access group 130 includes an access fragment 131 and a session description fragment 132. The access group 130 provides broadcast service access information indicating the ways the user can receive broadcast services in the core group 120, and detailed information about the session through which content in the broadcast services is delivered. Using this information, the terminal accesses the broadcast services.

The access fragment 131 provides access-related information for enabling access to broadcast services, and provides delivery methods and session information for a related access session. The session description fragment 132 may be included in the access fragment 131, and may provide location information in the form of a Uniform Resource Identifier (URI), in order for the terminal may check the session description information. The session description fragment 132 provides address information and codec information for the content existing in the session.

The broadcast service guide further includes a preview data fragment 124 and an interactive data fragment 125 in addition to the four groups. The preview data fragment 124 provides previews and icons for broadcast services and content, and the interactive data fragment 125 provides information about interactive broadcast services in which the user may participate.

Figure 2:
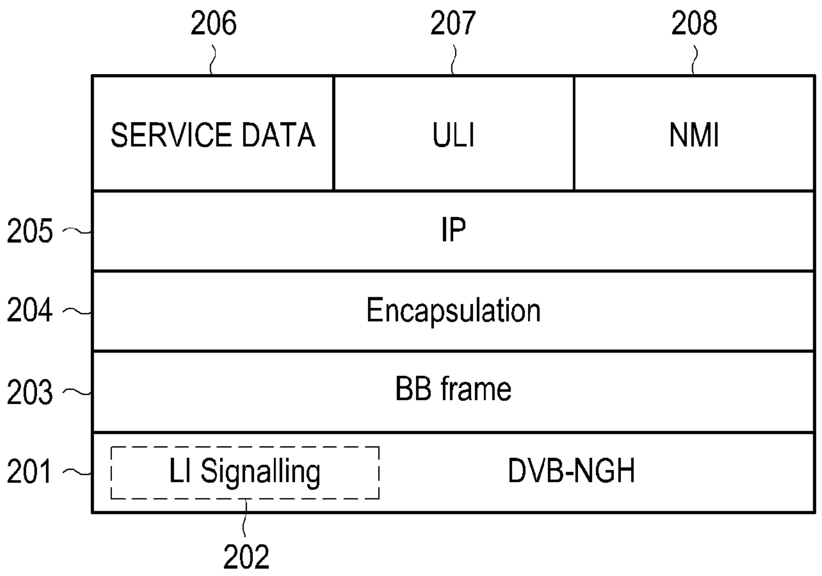
FIG. 2 illustrates an NGH protocol for DVB-NGH according to an embodiment of the present invention.

FIG. 2 illustrates an NGH protocol for DVB-NGH according to an embodiment of the present invention. Specifically, signaling information of an IP profile is transmitted and received in an upper layer of an Internet protocol (IP) layer 205.

Referring to FIG. 2, a DVB-NGH physical layer 201 transfers a bitstream using an appropriate modulation scheme, and transfers Layer-1 (L1) signaling 202. The L1 signaling 202 provides information used in a physical layer, such as information that a terminal uses for its access to or disconnection from DVB-NGH. Reference numerals 203 and 204 represent upper layers of the physical layer, wherein data received from their upper layer is converted into BaseBand (BB) frames through an encapsulation process.

Broadcast service data 206 (e.g., the broadcast service guide described in connection with FIG. 1), Upper Layer Information (ULI) 207 including network information from a data layer to an application layer of a transmission network where the broadcast service data is transmitted, and Neighboring Multiplexes Information (NMI) 208 including information about a transmission network(s) neighboring the transmission network are included in an upper layer of the IP layer 205. The ULI 207 and NMI 208 include signaling information of an IP profile. The signaling information of an IP profile is used to receive information existing in lower layers of the IP layer 205.

The ULI 207 includes Robust Header Compression (RoHC) information for compressing IP headers of all IP streams for their transmission and reception, information for mapping broadcast service components to Physical Layer Pipes (PLPs), and physical parameters of PLPs associated with broadcast services. For example, the ULI 207 may include syntaxes as given in Table 1 below.

TABLE 1

| Syntax | Number of bits | Identifier |
|---|---|---|
| service association section( ) { | | |
| section__length | 32 | uimsbf |
| number__of__services | 8 | uimsbf |
| for (i=0; i<N; i++){ | | |
| number__of__components | 8 | bslbf |
| for (j=0; j<N1; j++) { | | |
| URL__length | 8 | bslbf |
| for (k=0; k<N2; k++) { | | |
| URL__byte or IP address + port number | 8 | uimsbf |
| } | | |
| context__id | 8 or 16 | uimsbf |
| context__profile | 8 | uimsbf |
| static__info__length | 8 | uimsbf |
| for (l=0; l<N3; l++) { | | |
| static chain byte( ) | 8 | bslbf |
| } | | |
| Anchor__flag | 1 | uimsbf |
| PLP__id | 8 | uimsbf |
| MIMO__mode | 2 | uimsbf |
| RFU | 5 | uimsbf |
| } | | |
| T__INT__APLPF | 16 | uimsbf |
| BS__APLPF | 24 | uimsbf |
| CRC__byte | 32 | uimsbf |
| } | | |

RoHC information included in the ULI 207 includes a Uniform Resource Locator (URL) length field, a 'URL_byte or IP address+port number' field, a Context Identification (CID) field, a context profile field, a static information length (static_info_length) field, and a static chain byte field. The information for mapping broadcast service components to PLPs includes an anchor flag field, a PLP id field, a Multiple Input Multiple Output (MIMO) mode field, and a Reserved for Future Use (RFU) field. The physical parameters of PLPs associated with broadcast services include a T_INT_APLPF field and a BS_APLPF field.

Each field in Table 1 may be defined as in Table 2 below.

TABLE 2

| Fields | Definitions |
|---|---|
| section length | A field indicating a length of a section |
| number of services | A field indicating the number of broadcast services delivered on the current channel |
| number of components | A field indicating the number of components delivered through the broadcast service in a broadcast service loop |
| URL length | A field indicating a length of a "URL__byte or IP address + port number" field indicating each component |
| URL__byte or IP address + port number | A text byte field (IP address + port number) of a URL__byte value indicating each component, or an IP address indicating an IP channel on which each component is transmitted, and a port number. |
| context id | A field indicating a CID of a compressed IP stream |
| context profile | A field indicating a context profile of a compressed IP stream |
| static info length | A field indicating a length of a static chain byte sequence |
| static chain byte | A field indicating a byte sequence which is static information of a compressed IP stream |
| Anchor Flag | A field indicating that PLP is an anchor of all PLPs associated with a given broadcast service |
| PLP ID | A field indicating a PLP ID to which the component is delivered |
| MIMO__MODE | A field indicating use of Single Input Single Output (SISO)/MIMO structure |
| T__INT__APLPF | A field indicating a time (in milliseconds or Orthogonal Frequency Division Multiplexing (OFDM) symbols) between two consecutive frames of all broadcast service-related PLPs |
| BS__APLPF | A field indicating the maximum buffer size (e.g., the maximum size of allocated PLP frames) in OFDM cells |
| CRC byte | A field indicating a Cyclic Redundancy Check (CRC) byte of a related session |

In the CID field in Table 2, a small CID or a large CID is used for RoHC information. The small CID has one octet between 1 and 15, and the large CID has one or two octets between 1 and 16383. A size of the CID is determined by the following rules:

If a CID value starts with '1110': a small CID is used for RoHC information, a context size is 1 octet, and a CID has 4 bits;

If a CID value starts with '0': a large CID is used for RoHC information, a context size is 1 octet, and a CID has 7 bits; and If a CID value starts with '10': a large CID is used for RoHC information, a context size is 2 octets, and a CID has 14 bits.

A range of protocols used to compress an IP stream is notified for RoHC information in the context profile field among the fields in Table 2. A static chain byte field is used to initialize an IP stream compressed based on RoHC information, and the size and structure of the static chain byte field depend on the context profile.

Based on the T_INT_APLPF in Table 2, the receiver determines whether it can process previously allocated PLP frames, for the time, and may calculate a buffer space for processing the next frame of the associated PLPs.

The NMI 208 includes network information for a cell where a terminal receives broadcast services and its adjacent cells, and physical layer information for enabling fast reception of broadcast services. For example, the NMI 208 includes syntaxes as shown in Table 3 below.

TABLE 3

| Syntax | Number of bits | Identifier |
|---|---|---|
| mux information section( ) { | | |
| NGH_system_id | 16 | uimsbf |
| cell_id | 16 | uimsbf |
| number_RF | 3 | uimsbf |
| for (i=0; i<number_RF; i++) { | | |
| RF_id | 3 | uimsbf |
| bandwidth | 4 | uimsbf |
| transmission_mode | 3 | uimsbf |
| guard_interval | 4 | uimsbf |
| common_clock_reference_id | 4 | uimsbf |
| in_band_flag | 1 | uimsbf |
| if (in_band_flag){ | | |
| ngh_slot_length | 12 | uimsbf |
| ngh_slot_interval | 24 | uimsbf |
| } | | |
| } | | |
| number_of_LNC | 3 | uimsbf |
| for (i=0; i<number_of_LNC; i++){ | | |
| RF_main; | 3 | uimsbf |
| nof_PLP; | 8 | uimsbf |
| for (j=0; j<nof_PLP; j++){ | | |
| PLP_id; | 8 | uimsbf |
| } | | |
| } | | |
| } | | |

Each field in Table 3 may be defined as in Table 4 below.

TABLE 4

| Fields | Definitions |
|---|---|
| NGH_system_id | A field indicating an ID of an NGH network |
| cell_id | A field indicating an ID of an NGH cell |
| number_RF | A field indicating the number of radio frequencies (RFs) existing in a cell indicated by a Cell ID |
| RF_id | A field indicating an RF ID |
| bandwidth | A field indicating an RF transmission band |
| transmission_mode | A field indicating an NGH transmission mode |
| guard_interval | A field indicating a guard interval between OFDM cells |
| common_clock_reference_id | A field indicating an identifier of a common clock used in the system |
| in_band_flag | A field indicating use/nonuse of in-band signaling |
| ngh_slot_length | A field indicating current slot length corresponding to the number of OFDM cells |
| ngh_slot_interval | A field indicating the number of T intervals between the current NGH slot and the next slot |
| number_of_LNC | A field indicating the total number of Low Noise Converters (LNCs) in the current NGH system |
| RF_main; | A field indicating the main RF |
| nof_PLP; | A field indicating the number of PLPs in the current LNC |
| PLP_id; | A field indicating a PLP ID |

The ULI 207 and NMI 208 are transmitted and received in an SGDD.

Figure 3:
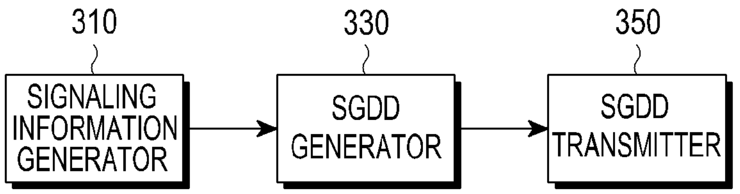
FIG. 3 illustrates apparatus for transmitting signaling information of an IP profile according to an embodiment of the present invention.

FIG. 3 illustrates an apparatus for transmitting signaling information of an IP profile according to an embodiment of the present invention.

Referring to FIG. 3, a signaling information generator 310 generates a ULI 207 including network information from a data layer to an application layer of a transmission network, and an NMI 208 including information about a neighboring transmission network(s). That is, the signaling information generator 310 generates the ULI 207 including RoHC information for all IP streams, information for mapping broadcast service components to PLPs, and physical parameters of PLPs associated with broadcast services shown in Table 1, and generates the NMI 208 including network information for a cell where the terminal receives broadcast services and its adjacent cells, and physical layer information for fast reception of broadcast services, as shown in Table 3.

An SGDD generator 330 generates an SGDD including the ULI 207 and NMI 208, and an SGDD transmitter 350 transmits the generated SGDD to a receiving apparatus.

Although the signaling information generator 310, the SGDD generator 330 and the SGDD transmitter 350 are implemented in separate units in FIG. 3, it will be understood by those of ordinary skill in the art that they may be implemented in a single unit.

Figure 4:
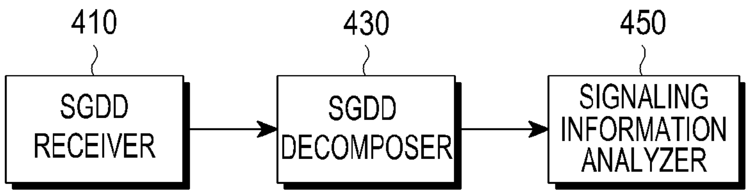
FIG. 4 illustrates an apparatus for receiving signaling information of an IP profile according to an embodiment of the present invention.

FIG. 4 illustrates an apparatus for receiving signaling information of an IP profile according to an embodiment of the present invention.

Referring to FIG. 4, an SGDD receiver 410 receives an SGDD transmitted from a transmitting apparatus and forwards it to an SGDD decomposer 430. The SGDD decomposer 430 decomposes the ULI 207 and NMI 208 including signaling information of an IP profile from the received SGDD, and delivers the ULI 207 and NMI 208 to a signaling information analyzer 450.

By analyzing each of the ULI 207 and NMI 208, the signaling information analyzer 450 checks network information from a data layer to an application layer of the transmission network, which is included in the ULI 207, and checks information about a neighboring transmission network, which is included in the NMI 208. That is, the signaling information analyzer 450 checks RoHC information for all IP streams, information for mapping service components to PLPs, and physical parameters of PLPs associated with broadcast services, all of which are included in the ULI 207, and checks network information for a cell where the terminal receives broadcast services and its adjacent cells, and physical layer information for enabling fast reception of broadcast services, both of which are included in the NMI 208.

Although the SGDD receiver 410, the SGDD decomposer 430, and the signaling information analyzer 450 are implemented in separate units in FIG. 4, it will be understood by those of ordinary skill in the art that they may be implemented in a single unit. Further, the SGDD decomposer 430 and the signaling information analyzer 450 may be implemented as a single controller.

Figure 5:
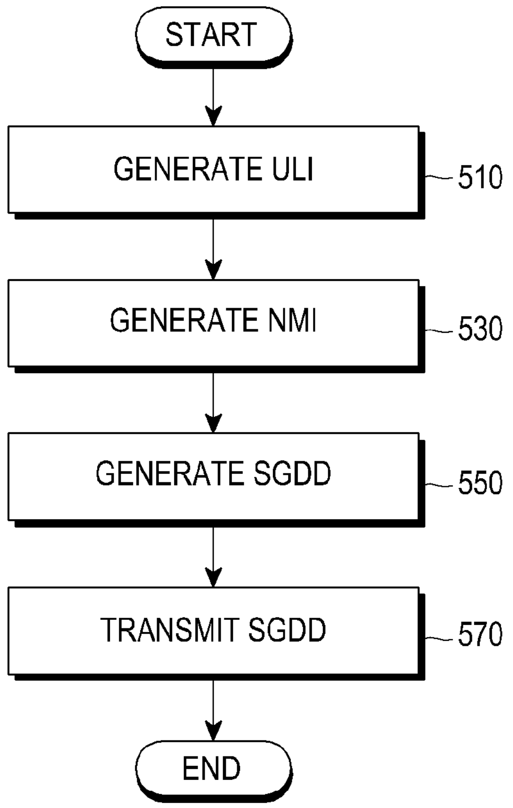
FIG. 5 is a flowchart illustrating a process of transmitting signaling information of an IP profile according to an embodiment of the present invention.

FIG. 5 is a flowchart illustrating a process of transmitting signaling information of an IP profile according to an embodiment of the present invention.

Referring to FIG. 5, in step 510, the signaling information generator 310 generates a ULI 207 including RoHC information for all IP streams, information for mapping broadcast service components to PLPs, and physical parameters of PLPs associated with broadcast services, as shown in Table 1 above. In step 530, the signaling information generator 310 generates a NMI 208 including network information for a cell where the terminal receives broadcast services and its adjacent cells, and physical layer information for enabling fast reception of broadcast services, as shown in Table 3 above.

In step 550, the SGDD generator 330 generates an SGDD including the generated ULI 207 and NMI 208. In step 570, the SGDD transmitter 350 transmits the generated SGDD to a receiving apparatus.

Alternatively, the ULI generation step (step 510) and the NMI generation step (step 530) are interchangeable.

Figure 6:
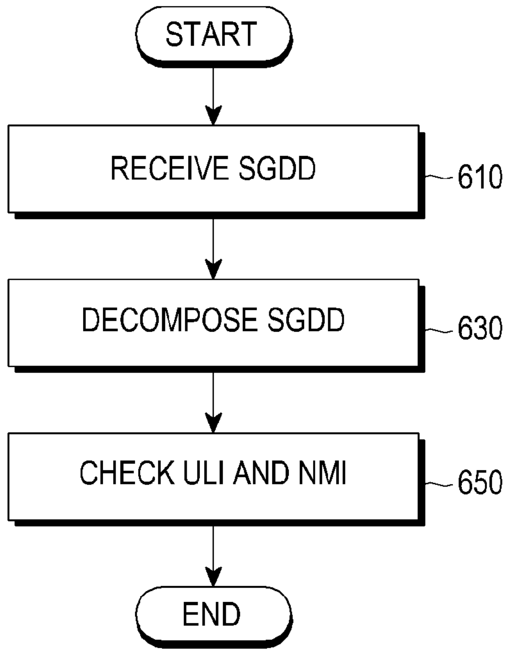
FIG. 6 is a flowchart illustrating a process of receiving signaling information of an IP profile according to an embodiment of the present invention.

FIG. 6 is a flowchart illustrating a process of receiving signaling information of an IP profile according to an embodiment of the present invention.

Referring to FIG. 6, the SGDD receiver 410 receives an SGDD transmitted from a transmitting apparatus in step 610, and the SGDD decomposer 430 decomposes an ULI 207 and an NMI 208 including signaling information of an IP profile from the received SGDD in step 630. In step 650, the signaling information analyzer 450 analyzes the ULI 207 to check for RoHC information for all IP streams, information for mapping service components to PLPs, and physical parameters of PLPs associated with broadcast services, and analyzes the NMI 208 to check for network information for a cell where the terminal receives broadcast services and its adjacent cells, and physical layer information for enabling fast reception of broadcast services.

In summary, in accordance with an embodiment of the present invention, signaling information of an IP profile to a receiving apparatus (e.g., terminal) in an SGDD in DVB-NGH is provided, thereby reducing the delay time in which the receiving apparatus gets the signaling information.

As is apparent from the foregoing description, the above-described embodiments of the present invention provide signaling information of a transmission network and a transmission network physical layer for a DVB-NGH IP profile, using an IP-based signaling method, such that a terminal may efficiently receive the signaling information.

Further, the above-described embodiments of the present invention provide a method for efficiently configuring signaling information of a transmission network and a transmission network physical layer for a DVB-NGH IP profile.

Additionally, the above-described embodiments of the present invention provide signaling information of a transmission network and a transmission network physical layer for a DVB-NGH IP profile, to a terminal in an SGDD, thereby reducing the delay time in which the terminal gets the signaling information.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting signaling information for receiving a broadcast service in a digital broadcasting system, the method comprising:
- generating service guide information including:
  - broadcast service data;
  - information about a transmission network where the broadcast service data is transmitted, including:
    - information for mapping broadcast service components to Physical Layer Pipes (PLPs);
    - an anchor flag field indicating whether a PLP is an anchor of all PLPs associated with a given broadcast service; and
    - physical parameters of the PLPs, including a field indicating a time between two consecutive frames of all broadcast service-related PLPs; and
  - information about one or more neighboring transmission networks; and
- transmitting the service guide information in an upper layer of an Internet Protocol (IP) layer, comprising:
  - transmitting the information about transmission network where the broadcast service data is transmitted as part of Upper Layer Information (ULI) in the upper layer; and
  - transmitting the information about one or more neighboring transmission networks as part of Neighboring Multiplex Information (NMI) in the upper layer.

2. The method of claim 1, wherein the information about the transmission network where the broadcast service data is transmitted further includes network information from a data layer to an application layer of the transmission network.

3. The method of claim 2, wherein the information about the transmission network where the broadcast service data is transmitted further includes Robust Header Compression (RoHC) information.

4. The method of claim 3, wherein the RoHC information includes:
- (i) a text byte field (URL_byte or IP address+port number) of a Uniform Resource Locator (URL)_byte value indicating each broadcast service component, or
- (ii) an IP address indicating an IP channel on which each of the broadcast service components is transmitted, and a port number.

5. The method of claim 1, wherein the information about the one or more neighboring transmission networks includes:
- network information for a cell where a receiver receives the broadcast service data and cells adjacent thereto, and
- physical layer information for enabling reception of the broadcast service data.

6. The method of claim 5, wherein the information about the one or more transmission networks further includes:
- a field indicating a network ID of the transmission network for the cell and the cells adjacent thereto,
- a field indicating a cell ID of the cell and the cells adjacent thereto,
- a field indicating a number of radio frequencies existing in the cell,
- a field indicating an ID of the radio frequency,
- a field indicating a transmission band of the radio frequency,
- a field indicating a transmission mode,
- a field indicating a guard interval between Orthogonal Frequency Division Multiplexing (OFDM) cells,
- a field indicating an identifier of a common clock used in the system,
- a field indicating use/nonuse of in-band signaling, a field indicating a current slot length corresponding to the number of OFDM cells, a field indicating a number of intervals between a current slot and a next slot, a field indicating a number of Low Noise Converts (LNCs) in the digital broadcasting system, a field indicating a main radio frequency, a field indicating a number of PLPs in a current LNC, and a field indicating an ID of the PLP.

7. An apparatus for transmitting signaling information for receiving a broadcast service in a digital broadcasting system, the apparatus comprising:

a generator which generates service guide information including:

broadcast service data;

information about a transmission network where the broadcast service data is transmitted, comprising:

information for mapping broadcast service components to Physical Layer Pipes (PLPs);

an anchor flag field indicating whether a PLP is an anchor of all PLPs associated with a given broadcast service; and physical parameters of the PLPs, including a field indicating a time between two consecutive frames of all broadcast service-related PLPs; and information about one or more neighboring transmission networks; and a transmitter which transmits the service guide information in an upper layer of an Internet Protocol (IP) layer, which includes:

transmitting the information about transmission network where the broadcast service data is transmitted as part of Upper Layer Information (ULI) in the upper layer; and transmitting the information about one or more neighboring transmission networks as part of Neighboring Multiplex Information (NMI) in the upper layer.

8. The apparatus of claim 7, wherein the information about the transmission network where the broadcast service data is transmitted further comprises network information from a data layer to an application layer of the transmission network.

9. The apparatus of claim 8, wherein the information about the transmission network where the broadcast service data is transmitted further comprises Robust Header Compression (RoHC) information.

10. The apparatus of claim 8, wherein the RoHC information comprises:

(i) a text byte field (URL_byte or IP address+port number) of a Uniform Resource Locator (URL)_byte value indicating each broadcast service component, or (ii) an IP address indicating an IP channel on which each of the broadcast service components is transmitted, and a port number.

11. The apparatus of claim 7, wherein the information about the one or more neighboring transmission networks comprises:

network information for a cell where a receiver receives the broadcast service data and cells adjacent thereto, and physical layer information for enabling reception of the broadcast service data.

12. The apparatus of claim 11, wherein the information about the one or more neighboring transmission networks further comprises:

a field indicating a network ID of the transmission network for the cell and the cells adjacent thereto, a field indicating a cell ID of the cell and the cells adjacent thereto, a field indicating a number of radio frequencies existing in the cell, a field indicating an ID of the radio frequency, a field indicating a transmission band of the radio frequency, a field indicating a transmission mode, a field indicating a guard interval between Orthogonal Frequency Division Multiplexing (OFDM) cells, a field indicating an identifier of a common clock used in the system, a field indicating use/nonuse of in-band signaling, a field indicating a current slot length corresponding to the number of OFDM cells, a field indicating a number of intervals between a current slot and a next slot, a field indicating a number of Low Noise Converts (LNCs) in the digital broadcasting system, a field indicating a main radio frequency, a field indicating a number of PLPs in a current LNC, and a field indicating an ID of the PLP.

13. A method for receiving signaling information for receiving a broadcast service in a digital broadcasting system, the method comprising:

receiving service guide information in an upper layer of an Internet Protocol (IP) layer, the service guide information including Upper layer Information (ULI) and Neighboring Multiplex Information (NMI);

checking, within the service guide information, for broadcast service data;

checking the ULI for information about a transmission network where the broadcast service data is transmitted; and checking the NMI for information about one or more neighboring transmission networks, which are included in the service guide information, wherein the information in the ULI about the transmission network where the broadcast service data is transmitted includes:

information for mapping broadcast service components to Physical Layer Pipes (PLPs);

an anchor flag field indicating whether a PLP is an anchor of all PLPs associated with a given broadcast service; and physical parameters of the PLPs, wherein the physical parameters of the PLPs include a field indicating a time between two consecutive frames of all broadcast service-related PLPs.

14. The method of claim 13, wherein the information about the transmission network where the broadcast service data is transmitted further includes network information from a data layer to an application layer of the transmission network.

15. The method of claim 14, wherein the information about the transmission network where the broadcast service data is transmitted further includes Robust Header Compression (RoHC) information.

16. The method of claim 15, wherein the RoHC information includes:

(i) a text byte field (URL_byte or IP address+port number) of a Uniform Resource Locator (URL)_byte value indicating each broadcast service component, or (ii) an IP address indicating an IP channel on which each of the broadcast service components is transmitted, and a port number.

17. The method of claim 13, wherein the information about the one or more neighboring transmission networks includes:

network information for a cell where a receiver receives the broadcast service data and cells adjacent thereto, and physical layer information for enabling reception of the broadcast service data.

18. The method of claim 17, wherein the information about the one or more neighboring transmission networks further includes:

a field indicating a network ID of the transmission network for the cell and the cells adjacent thereto, a field indicating a cell ID of the cell and the cells adjacent thereto, a field indicating a number of radio frequencies existing in the cell, a field indicating an ID of the radio frequency, a field indicating a transmission band of the radio frequency, a field indicating a transmission mode, a field indicating a guard interval between Orthogonal Frequency Division Multiplexing (OFDM) cells, a field indicating an identifier of a common clock used in the system, a field indicating use/nonuse of in-band signaling, a field indicating a current slot length corresponding to the number of OFDM cells, a field indicating a number of intervals between a current slot and a next slot, a field indicating a number of Low Noise Converts (LNCs) in the digital broadcasting system, a field indicating a main radio frequency, a field indicating a number of PLPs in a current LNC, and a field indicating an ID of the PLP.

19. An apparatus for receiving signaling information for receiving a broadcast service in a digital broadcasting system, the apparatus comprising:

a receiver which receives service guide information in an upper layer of an Internet Protocol (IP) layer, the service guide information including Upper Layer Information (ULI) and Neighboring Multiplex Information (NMI); and a controller which checks the service guide information for broadcast service data, checks the ULI for information about a transmission network where the broadcast service data is transmitted, and checks the NMI for information about one or more neighboring transmission networks, wherein the information in the ULI about the transmission network where the broadcast service data is transmitted comprises:

information for mapping broadcast service components to Physical Layer Pipes (PLPs);

an anchor flag field indicating whether a PLP is an anchor of all PLPs associated with a given broadcast service; and physical parameters of the PLPs, wherein the physical parameters of the PLPs include a field indicating a time between two consecutive frames of all broadcast service-related PLPs.

20. The apparatus of claim 19, wherein the information about the transmission network where the broadcast service data is transmitted further comprises network information from a data layer to an application layer of the transmission network.

21. The apparatus of claim 20, wherein the information about the transmission network where the broadcast service data is transmitted further comprises Robust Header Compression (RoHC) information.

22. The apparatus of claim 21, wherein the RoHC information comprises:

(i) a text byte field (URL_byte or IP address+port number) of a Uniform Resource Locator (URL)_byte value indicating each broadcast service component, or (ii) an IP address indicating an IP channel on which each of the broadcast service components is transmitted, and a port number.

23. The apparatus of claim 19, wherein the information about the one or more neighboring transmission networks comprises:

network information for a cell where a receiver receives the broadcast service data and cells adjacent thereto, and physical layer information for enabling reception of the broadcast service data.

24. The apparatus of claim 23, wherein the information about the one or more neighboring transmission networks further comprises:

a field indicating a network ID of the transmission network for the cell and the cells adjacent thereto, a field indicating a cell ID of the cell and the cells adjacent thereto, a field indicating a number of radio frequencies existing in the cell, a field indicating an ID of the radio frequency, a field indicating a transmission band of the radio frequency, a field indicating a transmission mode, a field indicating a guard interval between Orthogonal Frequency Division Multiplexing (OFDM) cells, a field indicating an identifier of a common clock used in the system, a field indicating use/nonuse of in-band signaling, a field indicating a current slot length corresponding to the number of OFDM cells, a field indicating a number of intervals between a current slot and a next slot, a field indicating a number of Low Noise Converts (LNCs) in the digital broadcasting system, a field indicating a main radio frequency, a field indicating a number of PLPs in a current LNC, and a field indicating an ID of the PLP.

25. The method of claim 1, wherein the field indicating a time between two consecutive frames of all broadcast service-related PLPs is T_INT_APLPF.

26. The method of claim 1, wherein the anchor flag field comprises one bit.

27. The apparatus of claim 7, wherein the field indicating a time between two consecutive frames of all broadcast service-related PLPs is T_INT_APLPF.

28. The apparatus of claim 7, wherein the anchor flag field comprises one bit.

29. The method of claim 13, wherein the field indicating a time between two consecutive frames of all broadcast service-related PLPs is T_INT_APLPF.

30. The method of claim 13, wherein the anchor flag field comprises one bit.

31. The apparatus of claim 19, wherein the field indicating a time between two consecutive frames of all broadcast service-related PLPs is T_INT_APLPF.

32. The apparatus of claim 19, wherein the anchor flag field comprises one bit.

33. The method of claim 25, wherein the time is represented in milliseconds or Orthogonal Frequency Division Multiplexing (OFDM) symbols.

34. The apparatus of claim 27, wherein the time is represented in milliseconds or Orthogonal Frequency Division Multiplexing (OFDM) symbols.

35. The method of claim 29, wherein the time is represented in milliseconds or Orthogonal Frequency Division Multiplexing (OFDM) symbols.

36. The apparatus of claim 31, wherein the time is represented in milliseconds or Orthogonal Frequency Division Multiplexing (OFDM) symbols.

* * * * *